(12) United States Patent
Shiels et al.

(10) Patent No.: US 6,222,925 B1
(45) Date of Patent: *Apr. 24, 2001

(54) INTERACTIVE ENTERTAINMENT CONTENT CONTROL

(75) Inventors: Martin A. Shiels, Brighton; Richard S. Cole, Redhill; Paul J. Rankin, Horley; Rosa Freitag, London, all of (GB)

(73) Assignee: U.S. Philips Corporation, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/439,199

(22) Filed: Nov. 12, 1999

Related U.S. Application Data (63) Continuation of application No. 08/705,548, filed on Aug. 29, 1996, now abandoned.

(30) Foreign Application Priority Data

Aug. 31, 1995 (GB) .................................................. 9817789

(51) Int. Cl.[7] ............................. H04N 7/167; H04N 7/08; G06F 3/00
(52) U.S. Cl. .......................... 380/211; 345/328; 348/5.5; 348/13; 348/473
(58) Field of Search ............................ 380/211; 345/328; 348/5.5, 13, 473

(56) References Cited

U.S. PATENT DOCUMENTS

| | | | |
|---|---|---|---|
| 3,318,517 | * | 5/1967 | Wells . |
| 4,305,131 | * | 12/1981 | Best . |
| 4,333,152 | * | 6/1982 | Best . |
| 4,445,187 | * | 4/1984 | Best . |
| 4,569,026 | * | 2/1986 | Best . |
| 4,846,693 | * | 7/1989 | Baer . |
| 5,161,034 | * | 11/1992 | Klappert . |
| 5,598,276 | * | 1/1997 | Cookson et al. ........................ 348/5 |
| 5,604,682 | * | 2/1997 | McLaughlin et al. . |
| 5,610,653 | * | 3/1997 | Abecassis ............................. 348/110 |
| 5,644,686 | * | 7/1997 | Hekmatpour ........................ 395/50 |
| 5,737,527 | * | 4/1998 | Shiels et al. . |
| 5,751,953 | * | 5/1998 | Shiels et al. . |
| 5,754,770 | * | 5/1998 | Shiels et al. . |
| 5,848,934 | * | 12/1998 | Shiels et al. . |

FOREIGN PATENT DOCUMENTS

| | | | |
|---|---|---|---|
| 7270987 | * | 1/1991 | (AU) . |
| 3595889 | * | 8/1991 | (AU) . |
| WO 92/08531 | * | 5/1992 | (WO) . |
| WO 94/13105 | * | 6/1994 | (WO) . |

* cited by examiner

Primary Examiner—Stephen C. Buczinski
(74) Attorney, Agent, or Firm—Gregory L. Thorne

(57) ABSTRACT

Methods and apparatus are provided for control access to, and user interaction with, a branch structured narrative entertainment (70). Selected paths (parallel lined portions BC, DE, GY) are locked to a user and may only be accessed on presentation of predetermined access data. The access data may comprise user identification codes or may be the time of day, with such paths only being made available at specific times.

35 Claims, 5 Drawing Sheets

INTERACTIVE ENTERTAINMENT CONTENT CONTROL

This application is a Continuation of application Ser. No. 08/705,548, filed Aug. 29, 1996, now abandoned.

The present invention relates to interactive entertainment systems and, in particular, to such systems in which a user is able to control, directly or indirectly, the path of a narrative or plot line.

An example of such a system is described in U.S. Pat. No. 4,305,131 to Robert M. Best, and comprises a motion picture system in which the viewer is treated as a character in the narrative. At branch points in the narrative, a character on screen will ask a question of the viewer: the viewer is provided with a hand held menu screen on which two or more command words appear, which words are amongst the limited vocabulary of a speech recognition unit of the system. The branch taken by the narrative will depend on how the viewer responds to the on-screen characters question, that is to say which of the command words is spoken by the viewer. The multiple story lines are held on optical disc as independently addressable video frames, blocks of compressed audio and/or cartoon graphics. A record retrieval circuit reads blocks of binary coded control information comprising a branching structure of digital points specifying the frame sequence for each story line. A dispatcher circuit assembles a schedule of cueing commands specifying precisely which video frames, cartoon frames and sections of audio are to be presented at which instant of time. A cueing circuit executes these commands by generating precisely timed video and audio signals.

A problem with systems such as that as described by Best is that the video discs carrying the information make available, through successive playings with differing user choices, all of that information whenever and whoever is playing the disc. This can lead not only to the purchaser of a disc rapidly becoming bored, it can also lead to restrictions on availability, with discs being classified for content as in the cinema.

It is an object of the present invention to provide an entertainment apparatus and method for controlling the same where certain in-built limitations actually serve to enhance the viewer's enjoyment.

It is a further object of the present invention to allow for parental control over the content of an interactive entertainment.

In accordance with the present invention there is provided an interactive entertainment apparatus operable to output sequences of image frames comprising a user-influenced path through a branch structured narrative, the apparatus comprising: a source of image frames for all branch structure paths of the narrative; branch storage means for data defining the narrative branch structure; user operable input means; branch selection means coupled to the branch store and operable to determine when the narrative reaches a branch point and to call one of two or more image frame sequences from the image frame source in dependence on the user input; and an output for the selected image frame sequences; characterised in that the branch storage means contains further data identifying one or more image frame sequences as locked, and the branch selection means is operable to determine when a branch point having one or more locked paths therefrom is approaching, to call for predetermined access data, and to restrict selection to other than the lock path or paths in the absence of said predetermined access data.

User storage means may be provided containing at least one user specific code (such as a PIN number), with that code satisfying the call for predetermined access data. With such an arrangement the branch selection means is preferably configured to access the user storage means when calling for the access data. The user storage means where provided is preferably non-volatile and removable from the apparatus, such as a data card or smart card holding the user specific code or codes, with the apparatus including means for reading the code or codes from the card.

Rather than using a removable user memory, the apparatus may require the or each user specific code to be stored in the user memory by input thereof via the user operable input means: for example, at the start of a narrative containing locked paths, the user may be requested to key in a path unlock code or key number.

In an alternative arrangement, the apparatus may include a current time of day source accessible by the branch selection means, with the call for predetermined access data being satisfied when the current time lies within a specified period: In other words, the system supports narrative titles which have some paths locked off at various times of he day. For example, paths containing "adult" material may only be unlocked after 9.00 pm. Unlocking on specific dates may also be provided.

Where the source of image frames includes a remote server connected to the apparatus through a data transmission network, the predetermined access data may be transmitted from the remote server to the apparatus, with the apparatus being operable to identify and store the access data. In this way, the remote server can unlock closed paths, perhaps at different times of day, rather than having to send different video segments.

Two or more image frame sequences may be locked in such a way as to require respective different arrangements of predetermined access data by the branch selection means for unlocking (for example providing different levels of locking), and the branch selection means may be operable to call for the appropriate one of the at least two different respective access data arrangements.

An image generating means may be provided to generate display messages to the user on initialisation of the apparatus and in the event of non-receipt of the predetermined access data, for example to request user input of a PIN number or to give system messages such as "Path Closed!".

Also in accordance with the present invention there is provided a method for control of an interactive entertainment apparatus, where the apparatus presents to a user a branch structured narrative, and user input determines which path is followed at at least one narrative branch point, characterised in that one or more narrative paths is identified as locked and requires predetermined access data to be presented to allow access thereto, otherwise an unlocked path will be followed.

As described above, at least two locking levels may be supported for respective paths, with different predetermined access data being required for each locking level. The locking may comprise encryption of locked path image sequences with the predetermined access data comprising one or more decryption key codes.

During the narrative, the user may suitably be provided with a visual indication of each approaching branch point, except for those cases where a branch has only one unlocked path therefrom and the predetermined access data has not been received.

Further features and advantages of the present invention will become apparent from reading of the following description of preferred embodiments of the present invention, given by way of example only, and with reference to the accompanying drawings in which.

In the following example, we concentrate particularly on the case where the image frames accompanying the narrative are video frames, although as will be understood and as will be described, the present invention is equally applicable to sequences of animated image frames, and compound frames formed, for example, of a "blue-screened" video image character overlying a two or three dimensional computer graphics generated background.

Figure 1:
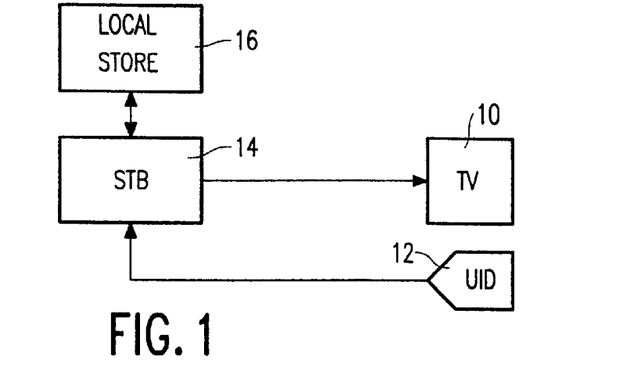
FIGS. 1 to 4 show differing combinations of material source supplying a user interface apparatus embodying the present invention.

FIGS. 1 to 4 represent a number of different ways by which an interactive narrative may be supplied to a user. In each case, the user views the received narrative on a monitor screen 10, suitably a television set, and is provided with an input device (UID) 12 for inputting commands, responses or other data as required by the particular application. In addition, the user is provided with an interface apparatus in the form of a set top box (STB) 14 to which the narrative source or sources are coupled, to which the user commands are input, and from which the television receives the signal for display. The user input device 12 has simple controls as required by the application, for example a keypad, three select buttons and up/down/left/right shift controls or a joystick, and may be hard wired to the STB as shown in FIG. 1, or connected by infra-red (IR) link in known manner as in FIG. 2.

Figures 2, 3, 4:
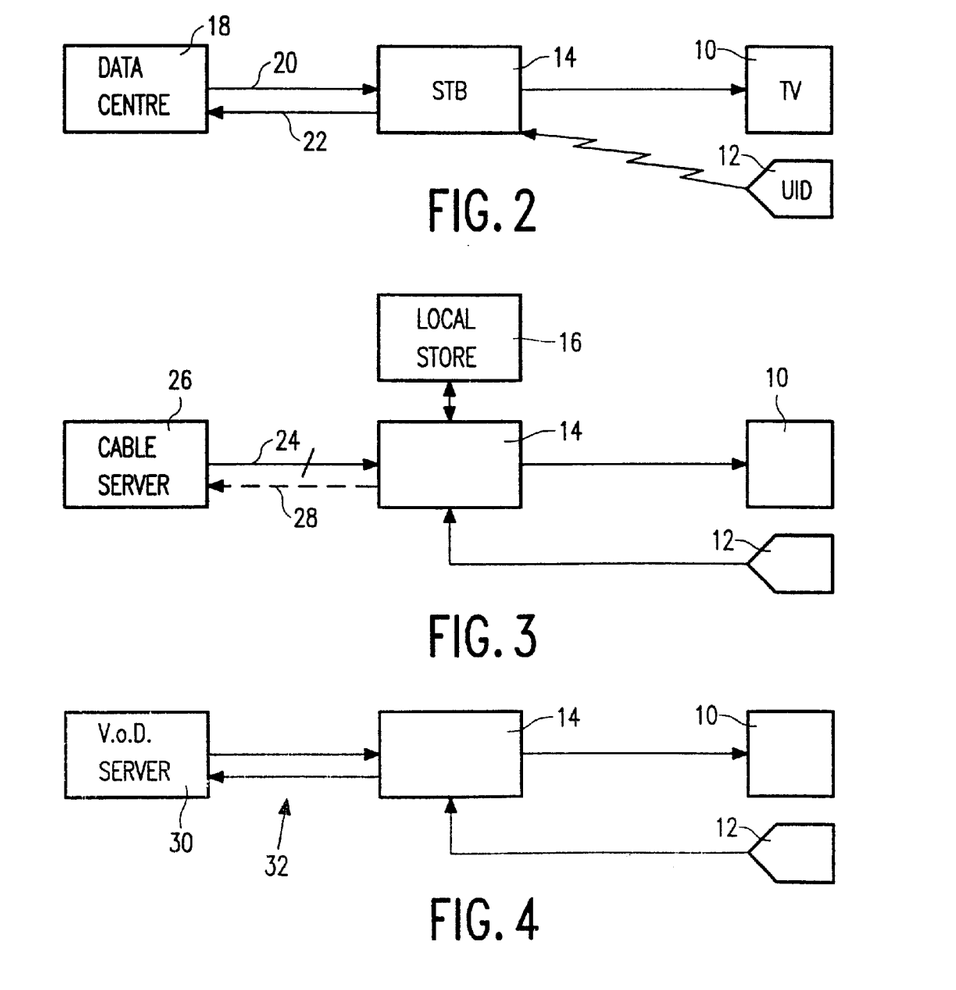

In the embodiment of FIG. 1, the narrative video and structure together with subsidiary information is supplied wholly from a local data source 16, such as a compact disc player or CD-ROM. In the embodiment of FIG. 2, the narrative video, structure and other information is supplied wholly from a remote source 18 via a data network 20, with user commands being sent to the remote source via a return path 22 of the network. In the embodiment of FIG. 3, the narrative video and other information is supplied as multiplexed channels on a single line 24 from a remote source 26, such as a cable television network server and is supplemented by information such as the structure from the local data source 16. In order to avoid the need for mass memory at the user site a return line 28 may be provided to give the user site at least partial control over the information sent out from the remote store. In the embodiment of FIG. 4, the narrative is supplied via a Video on Demand (VoD) system from a server 30 over a network 32, access to which may require the user to enter an identification code or insert a smart card or similar into an appropriate card reader to enable decryption of encrypted signals. As will be described the encryption may be applied to only certain paths of the narrative and, rather than providing separate units for decryption and card reading, these functions may be provided within the STB.

Figure 5:
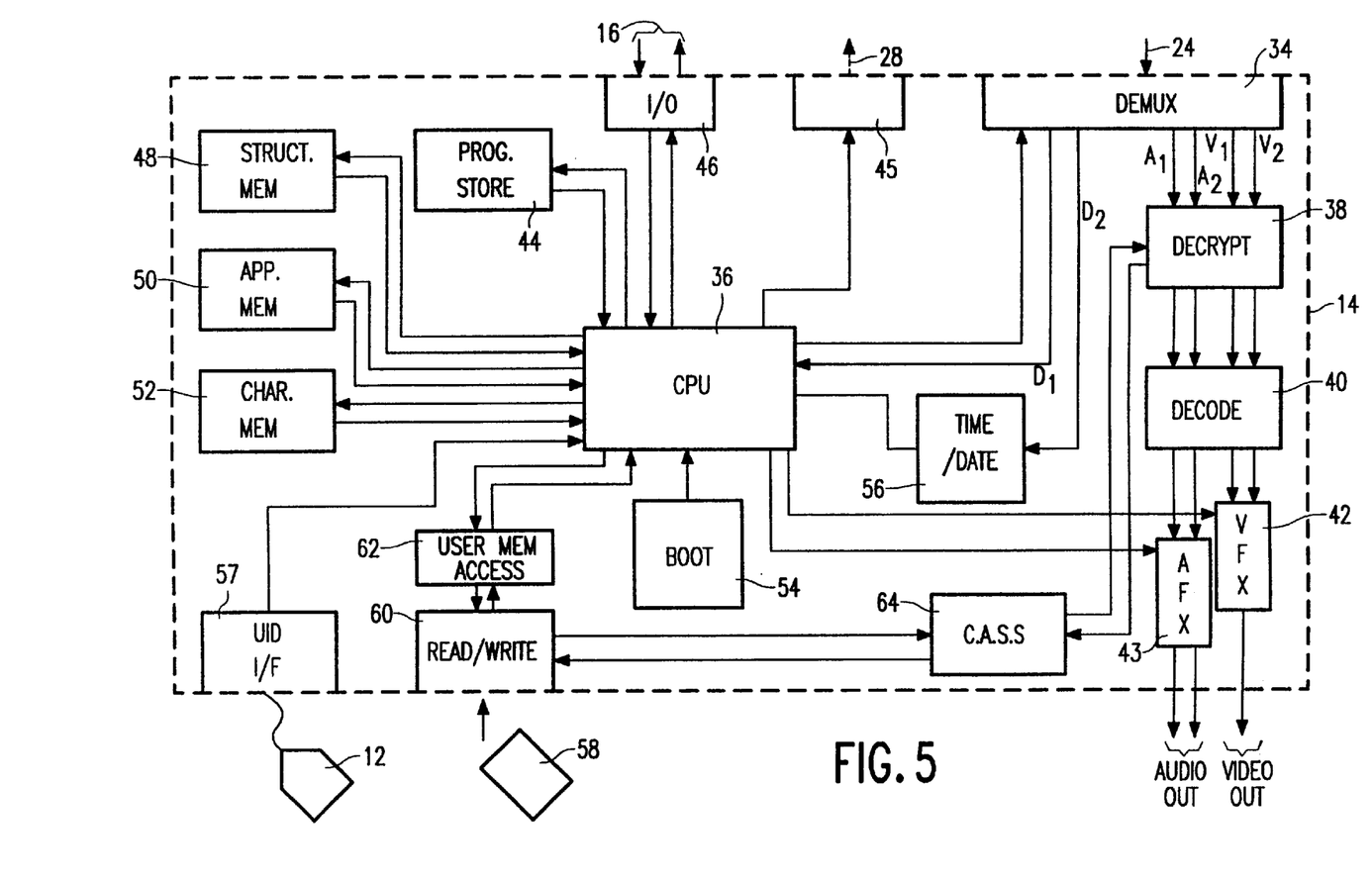
FIG. 5 is a schematic representation showing the user interface apparatus of FIG. 3 greater detail.

FIG. 5 shows the internal structure of the STB 14 when set up for the configuration of FIG. 3, that is to say with input from both remote source 26 via network 24 and local source 16. The incoming signal from the network 24 contains a number of independent service components (audio. video and data streams) multiplexed together. In this example, the signal contains two data streams $D_1$ and $D_2$ the functions of which are explained below, together with two audio streams $A_1$ and $A_2$ (for example left and right channels of a stereo audio signal) and two video frame streams $V_1$ and $V_2$. The multiplexed signal is received by a demultiplexer 34 which splits it into the separate components under control of a processor 36. Before being output from the STB the audio and video may pass through decryption 38 and decoding 40 stages, the video signals may be processed 42 to provide video effects such as picture-in-picture (PIP), and the audio signals may be subject to audio processing 43 as will be described below.

The first of the data streams $D_1$ is input to the processor 36 and contains program information specifying how the processor is to handle the audio and video streams and other information specific to features of the particular interactive narrative. This program information is held by the processor in program store 44. A specification for the branch structure of the narrative may be downloaded via $D_1$ (in response to a processor call on the network return path 28, via interface 45) or it may be read from local storage 16 via interface 46, with the processor sending track addressing and play commands as required. The branch structure is stored in structure memory 48, with further memories being provided for application features 50 and character features 52, as may be required by the form of the entertainment. Whilst shown in the Figure as separate stores, it will be readily appreciated that the program store 44 and the structure, application and character memories, 48, 50, 52 may be provided as respective areas of a single memory, provided that the more detailed addressing and associated access times for the larger memory do not unduly affect performance.

On powering up of the STB 14, a boot strap loader 54 initialises the processor and instructs it to call for the branch structure and program information from the appropriate sources. Alternatively, and more simply, the bootstrap loader 54 may just initiate the calling up of the program information, with the first instruction of that program information being for the processor 36 to call up the branch structure and store it in program store 44.

Within the structure store one or more paths may be identified as locked (as shown by the double-linked segments of FIGS. 6 and 7) with a predetermined access code or codes being required to unlock the path. These codes may be made available to the user on a smart card 58, provided on a "pay-per-view" or "pay-per-play" basis. Alternately, the user may be required to enter a personal identification number (PIN) via the UID 12 at the start of the narrative, being prompted by a suitable message generated by the video or audio processing stages 42,43. These locked paths may contain material of an "adult" nature and, by use of selected path locking, separate copies of the narrative for "adult" and "family" viewing are not required.

Some lock paths of the narrative may be unlocked by information as to the current date and time of day and, to avoid the need for the STB to maintain an accurate, non-volatile, clock source, a time/data store 56 is provided, with the timing information being updated at regular intervals from the remote source using data component stream $D_2$ as shown. For the FIG. 1 embodiment, where there is no remote source, the data/time information might be obtainable from the local source if that maintained its own clock. By unlocking various of the paths on the basis of time and/or date, the narrative entertainment may take on a different character depending on when it is played. For example, some scenes may only be available during the daytime and would be locked for the rest of the time. Scenes of "adult" material may only become available after 9.00 pm for example and some scenes might only rarely become available, for example on Christmas Day. Preferably, in instances where only a single unlocked path is available at a branch point, that path is automatically selected by the apparatus with the audio and/or visual cues being suppressed to hide the fact of the locked branch.

Signals from the user input device (UID) 12 are received by the STB at UID interface 57 and, from there passed to the processor 36. If, as in FIG. 2, the UID 12 is coupled to the STB via infra-red link, the interface 56 would include a suitable infra-red receiver.

For some forms of narrative entertainment, the user's interaction may be sporadic or episodic with the equipment being switched off in between sessions. To avoid the user being forced to re-start from scratch each time the equipment is switched on, a non-volatile user memory is provided in which features such as the user's current position within a narrative, user preferred system settings etc are stored. The user memory may suitably be held on a removable storage device such as the smart card 58 with the STB having a suitable card reader 60 with access to that area of the card storing the user memory being made via user access control 62: user memory access control 62 may, alternatively, be a purely software route executed within processor 36.

As described, the interactive entertainment may be provided by a remote server on a "pay-per-play" or limited access basis with the audio and video signals or sections thereof being transmitted in encrypted form and requiring particular codes to enable them to be decrypted in such a situation, the smart card 58 providing the non-volatile user memory may have a further function as a part of the decryption system. In such a case, the smart card 58 would carry a series of the codes, one or more of which would be required by decrypter 38 to decrypt the audio and video signals. Data stream D, would contain an identifier for one or more of the codes which identifier would be passed to a conditional access sub-system (CASS) 64, which in turn would use the identifier to address the stored codes on the smart card (via card reader 60) and, having obtained the necessary code or codes from the smart card, the CASS 64 would forward the obtained codes to the decrypter 38.

Where the video and/or audio signals are transmitted in compressed form, for example discrete cosine transform coded video according to MPEG standards, the decoder 40 may be provided. A switchable by-pass to the decoder (not shown) may be provided for the case where the display (television) is already equipped with. and set up for, decoding of the standard.

The video effects stage 42 is operated under control of the processor 36 to provide those features of the displayed image which are locally generated under the direction of the application program and/or user input, rather than being present in the video data supplied from the remote or local source. Such features may include menu bars, user movable cursors, system messages and so forth. As previously mentioned, one of the possible video effects is picture-in-picture in-picture (PIP) where the in-screen picture may be used to provide supplementary or future historical information about the narrative to the user. In one possible arrangement, video data streams $V_1$ and $V_2$ may synchronously show a particular scene of the narrative being played out, but with each being presented through the "eyes" of a different character within the scene such that a user may select from different viewpoints within a scene.

Where the narrative is composed of animated (rather than video) images, the effects stage 42 may handle the rendering of the images, with the remote source supplying the source and instruction data. Whilst this would require a significant increase in processing power for the STB, the user interaction could then include modification of the images themselves in addition to directing narrative branch point selection. As previously mentioned, the effects stage may also handle compound images, taking a video sprite and overlying it on a locally generated background image.

The audio effects stage 43 may be used for processing of the received audio signals $A_1,A_2$ in order to generate effects such as echo, without requiring supply and/or storage of multiple versions of an audio segment. The stage may also be used for local generation of some sound effects, suitably those required as immediate response to a user input, with basic waveform data, call commands and so forth being downloaded to the application memory 50 at the start of a session or on initialisation.

Figure 6:
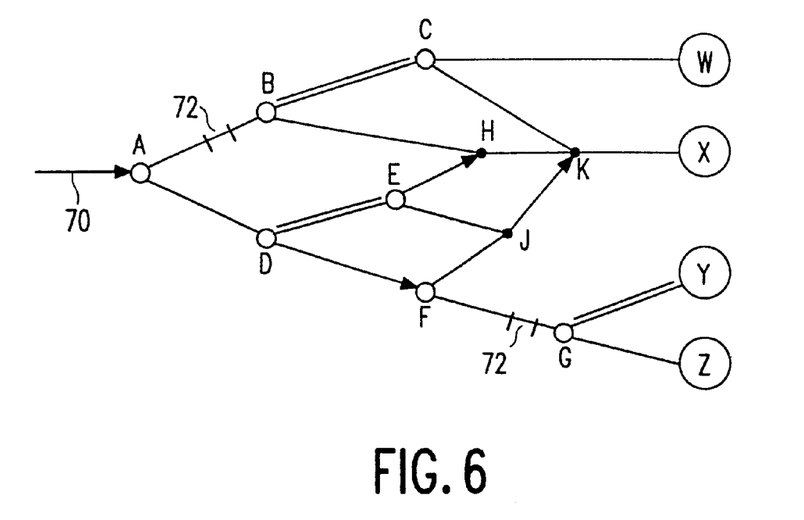
FIGS. 6 and 7 show different arrangements of narrative structure having locked paths.

Different forms of narrative. including locked scenes, may be supported by the STB of FIG. 5 using various of the facilities it provides, as required by the form of the narrative itself. FIG. 6 shows a branched narrative structure starting with a common introductory portion 70, which would serve to set the scene for the narrative, introduce the viewer to the characters and so forth. At branch nodes A to G a decision is required as to which path the narrative will take, with the user navigating through the network of possible story lines to reach one of the four possible endings W to Z. In order to avoid an "explosion" of possible endings, which would require a large amount of video data to be available for a relatively short narrative, some paths combine (at nodes H, J and K) such that some sections of the narrative (for example H to K) may appear within the narrative regardless of which path is chosen at node A for example. In order to maintain the user's "immersion" in the narrative story line it is important that, at both branching and combining nodes there is no discernable break in the video stream. Detailed techniques for seamless joining of video sequences are described in, for example, our co-pending United Kingdom patent applications 9424429, 9424436 and 9424437 (our references: PHB 33952, PHB 33950 and PHB 33951). A principal requirement for seamless joining is that the system has sufficient time to call up the selected next video segment and synchronise its start to the end of the present sequence. To enable this, a finite period prior to the end of the present video sequence is provided, for example as shown at 72 in FIG. 6, during which period the user may interact via UID 12 (FIG. 1). The location of the interaction periods 72 relative to the narrative is a feature of the structure, and is held in structure memory 48 of the STB (FIG. 5) as in the location of the locked scenes, indicated by the double-lined portions from B to C, D to E and G to Y.

The existence of an interaction period may be indicated to the viewer in a number of different ways. For example, an asterisk or a menu of possible options may be displayed on the screen: this menu is preferably provided via the video effects unit 42 of the STB such that, as soon as the user has selected an item, the menu may be removed from the screen to minimise the intrusion. The positioning of the menu should be such as to avoid blocking the on-screen story and may be provided as, for example, a picture-in-picture or as a pull-up menu which the user can access during an interaction period. These visual indicators of interaction periods are preferably suppressed by the system where only one unlocked path is available from a branch node, with the system having called for, but not received, the access data.

Each branch node of the narrative is preferably provided with a default setting such that, if there is no user input during the interaction period 72, then the narrative will continue along the default path without stalling for lack of instruction, and no part of this default path should be locked.

Figure 7:
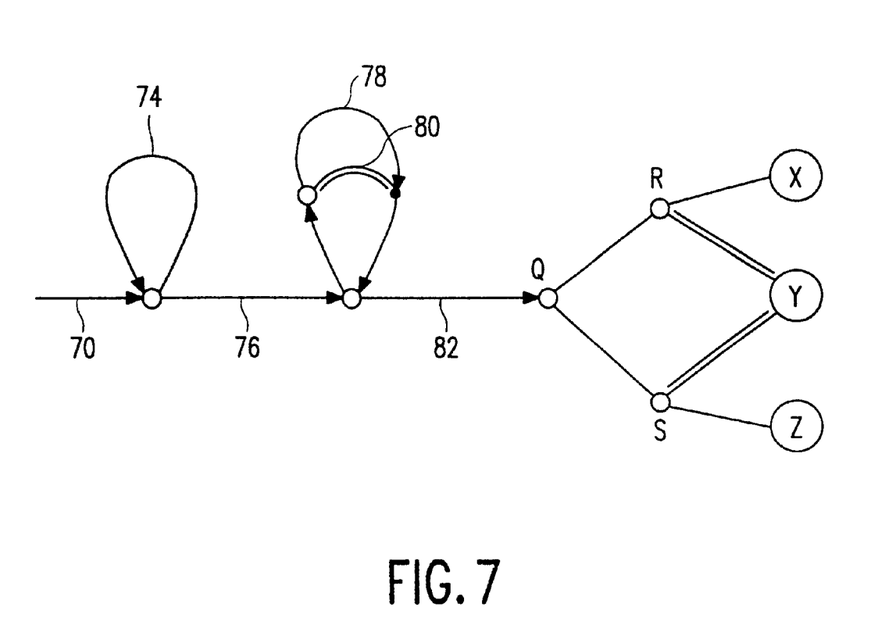
Figure 7A:
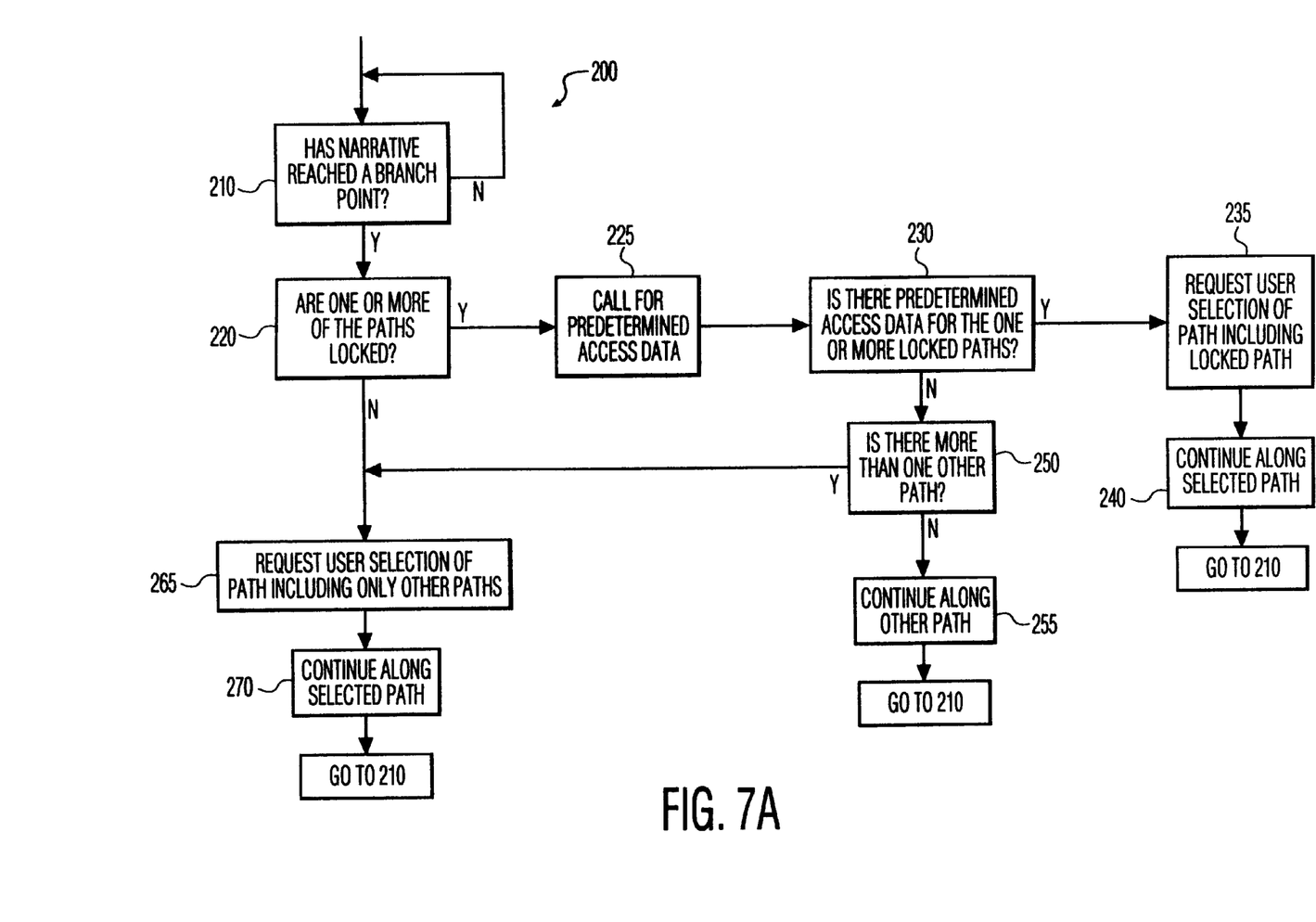
FIG. 7A is a flow diagram illustrating elements of an embodiment of the present invention.

FIG. 7A shows a flow diagram 200 illustrating elements of an embodiment of the present invention. In a narrative, there are locked paths and other paths. For purposes of discussion, an "other path" is any path other than a locked or unlocked path. As discussed above, the narrative is examined to determine when a branch point is reached (step 210). After a branch point is reached, the branch point is examined to determine if one of the paths is locked (step 220). If none of the paths are locked, then the user is prompted for a path selection and thereafter, the narrative continues until a subsequent branch point is reached (steps 265 and 270). In a case wherein one or more of the paths is locked, there is a call for predetermined access data (step 225), and thereafter, it is determined if there is predetermined access data for the one or more locked paths (step 230). When there is predetermined access data for the one or more locked paths, the user is prompted for a path selection which includes the one or more locked paths (step 235) and thereafter, the narrative continues until a subsequent branch point is reached (step 240). When there is no predetermined access data for the one or more locked paths, it is determined if there is more than one other path (step 250). When there is only one other path, the narrative continues on the other path until a subsequent branch point is reached (step 255). For a case wherein there is more than one other path, the user is prompted for a path selection which does not include the one or more locked paths (step 265) and thereafter, the narrative continues until a subsequent branch point is reached (step 270).

The audio accompaniment to the video sequences of FIG. 6 is not tied to the video itself but instead is called up as a feature of the narrative structure. This enables sections of the audio (such as dramatic or background music) to be re-used during the course of the narrative, for example to provide an audio, rather than a visual, cue to the user that interaction may take place or is required. As mentioned, some of this audio may be generated locally.

An alternative form for the branch structure is shown in FIG. 7. As before, the narrative starts with a common introductory portion 70 leading to a first branch node L. Instead of a diverging branch output, branch node L provides access to a narrative loop 74 which returns to node L at its end, following which the narrative continues along path 76 to another branch node M. The narrative loop 74 may be used to enable the viewer to access background or subsidiary information to the narrative: the default setting for node L would be to continue with narrative section 76. At node M, a further narrative loop is provided having within that loop a further branch node N and recombining node P linked by two possible loop narrative paths 78 and 80. Multiple loop nestings, as well as loops within loops may be provided. As shown, the narrative loop structure may be combined with a diverging branch structure with diverging branch node Q following narrative section 82 and further branch nodes R and S leading to conclusion of the narrative at one of three possible endings X, Y or Z. As with the narrative structure of FIG. 6, certain paths may be locked—in this case loop narrative path 80 and those paths leading to ending Y from branch nodes R and S.

Figure 8:
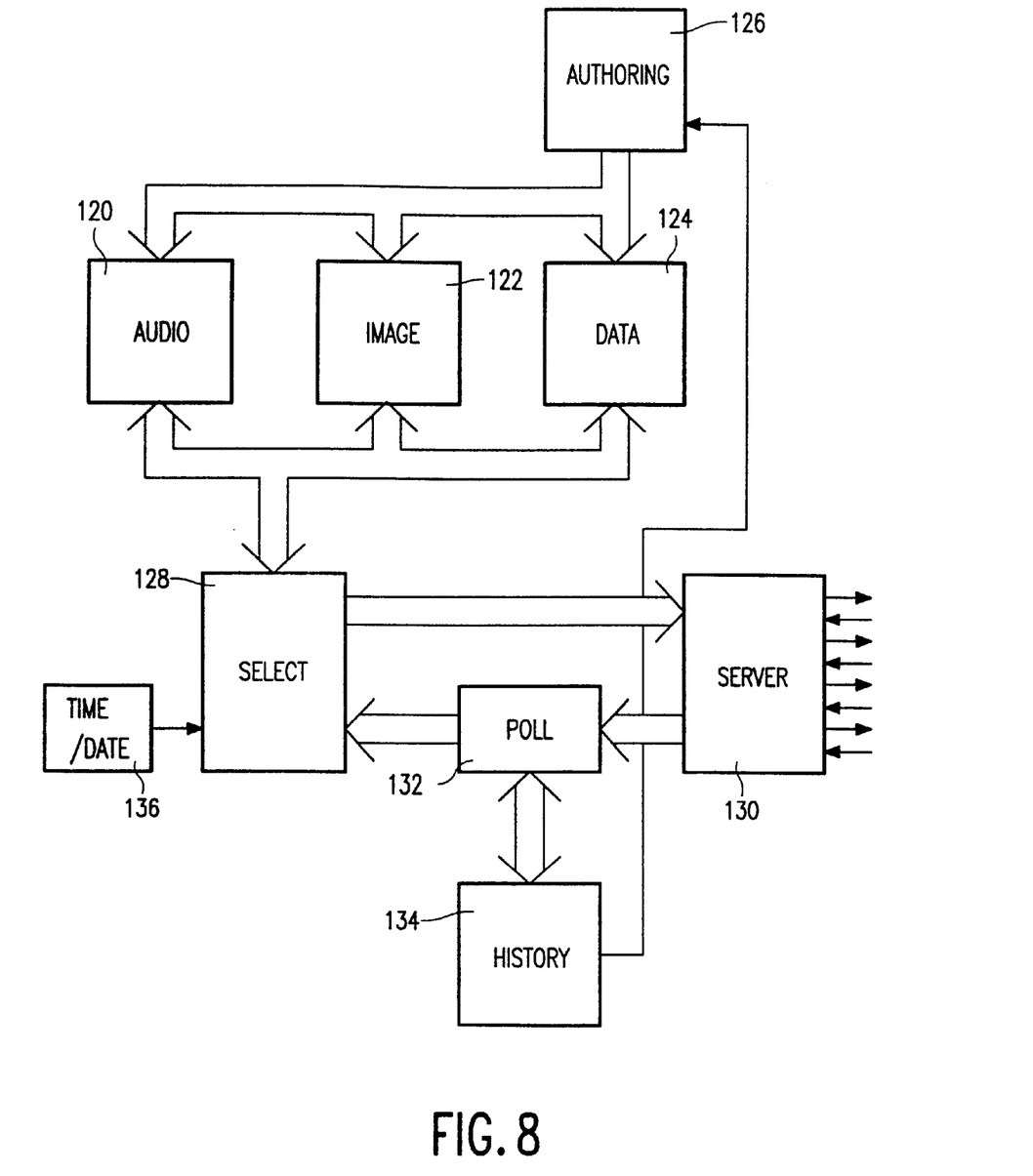
FIG. 8 is a schematic representation of a remote server providing a source of data to the apparatus of FIG. 5.

A remote source apparatus for providing the narrative entertainment to a number of users is illustrated schematically in FIG. 8. Stores of audio 120, image (video or animation) 122 and source 124 data hold the basic components of the interactive entertainment. These may just be loaded once with a complete narrative or, where the narrative is episodic (such as a soap opera) they may be updated on a regular basis via authoring suite 126.

A source select unit 128 combines the required audio, image and data components to a signal which is sent out to remote users over a network and via a network server 130. The network server also receives user responses at interaction periods via return paths of the network and passes these to a response polling unit 132. Where the system has the capability to handle individual requests (i.e to allow non-synchronised play of the narrative entertainment by the different users), the response polling unit 132 simply passes a data request to the source select unit 128 identifying which audio, image and/or data components are to be passed to which user. A record of the request is passed to a history store 134.

Where the system provides the entertainment as a broadcast, requiring all users to participate together, the branch selection may be made by majority vote, with the response poll section 132 collating the received user requests. In order to maintain the narrative inertia, a weighting factor based on past interactions may be generated from the history store, with the weighting factor applied to the requests cast before the selection is made.

Where the entertainment is incrementally generated through the authoring suite 126, the suite may be provided with means for generating schematics corresponding to the current storyline, with an indication (derived from history store 134) of the relative popularities of different branches of the story. With this facility, the author's task of determining which parts of the narrative may be deleted and which parts should be extended or combined is greatly simplified.

The locking mechanism described earlier may be employed also at the source apparatus, with certain parts of the narrative being locked at the command of the author such that they are not sent out by select stage 128. These locked parts may comprise future episodes which become unlocked at particular times or on a particular data. with the unlocking being handled by the select stage 128 in response to a time/date signal from a local source 136. In this way the author is not required to unlock each part of parts of the narrative at the appropriate time.

In an alternative arrangement, where unlocking is handled at the remote user site, the select unit 128 may call up the predetermined access codes required for unlocking from data store 124 and send them out to the remote users at particular times/dates.

From reading the present disclosure, other modifications and variations will be apparent to persons skilled in the art. Such modifications and variations may involve other features which are already known in the art and which may be used instead of or in addition to features already described herein. For example, some of those features described in relation to the STB (14, FIGS. 1 to 5) may instead be provided within a personal computer and others within a television or display unit. The reference to an apparatus in the following claims will be readily understood to cover all arrangements where the various recited features operate together in the manner described, regardless of whether those features are provided in a single unit or distributed amongst a number of interconnected units.

Although claims have been formulated in this application to particular combinations of features, it should be understood that the scope of the disclosure of the present application also includes any novel feature or combination of features disclosed herein either explicitly or implicitly, whether or not relating to the same invention as presently claimed in any claim and whether or not it mitigates any or all of the same technical problems as does the presently claimed invention. The applicants hereby give notice that new claims may be formulated to such features and/or combinations of such features during prosecution of the present application or of any further application derived therefrom.

What is claimed is:

1. A computer program segment embodied on a computer readable medium operable to output sequences of image frames comprising a user-influenced path through a branch structured narrative, said computer program segment comprising:

a first computer code segment operable to determine when the narrative reaches one of a plurality of branch points, operable to retrieve one of two or more image frame sequences in dependence on a user input, and operable to prompt the user for input that determines path selection at least at one of said plurality of branch points; and a second computer code segment operable to identify one or more image frame sequence as locked, operable to retrieve predetermined access data when a branch point having one or more locked path is approaching, and operable to restrict user selection to other than the locked path or paths in the absence of said predetermined access data.

2. The computer program of claim 1, wherein said second computer code segment is operable to retrieve a user specific code as said predetermined access data and to restrict user selection to other than the locked path or paths in the absence of said user specific code being a predetermined value.

3. The computer program of claim 1, wherein said second computer code segment is operable to retrieve a user specific code as said predetermined access data and to restrict user selection to other than the locked path or paths in the absence of said user specific code being at least one of a plurality of predetermined values.

4. The computer program of claim 1, wherein said second computer code segment is operable to retrieve a time indication as said predetermined access data and to restrict user selection to other than the locked path or paths in the absence of said time indication being within a specified period.

5. The computer program segment of claim 1, wherein said computer program segment is operable to identify said predetermined access data from a data transmission.

6. The computer program segment of claim 1, wherein the first computer code segment is operable to identify at least two image frame sequences as locked and requiring of at least two respective different arrangements of predetermined access data for unlocking, and is operable to call for the appropriate one of the at least two different respective access data arrangements.

7. The computer program segment of claim 1, wherein the computer program segment is operable to generate a user message in the event of non-receipt of said predetermined access data.

8. The computer program segment of claim 1, wherein the computer program segment is operable to identify at least two locking levels for respective paths, with different predetermined access data for each locking level.

9. The computer program segment of claim 1, wherein the computer program segment is operable to identify an encrypted locked path image sequence and to utilize said predetermined access data as one or more decryption key codes for decrypting the encrypted locked path image sequence.

10. The computer program segment of claim 1, wherein the computer program segment is operable to generate a visual indication of each approaching branch point except where a branch has only one unlocked path therefrom and said predetermined access data is absent.

11. A computer program segment operable to present to a user a branch structured narrative having a plurality of branch points, operable to prompt a user for input to determine which path is followed at a narrative branch point, and operable to identify a narrative path as locked and to require predetermined access data to present to the user the locked narrative path.

12. The computer program segment of claim 11, wherein said computer program segment is operable to retrieve a user specific code as said predetermined access data and to restrict user selection to other than the locked path in the absence of said user specific code being a predetermined value.

13. The computer program segment of claim 11, wherein said computer program segment is operable to retrieve a user specific code as said predetermined access data and to restrict user selection to other than the locked path in the absence of said user specific code being at least one of a plurality of predetermined values.

14. The computer program segment of claim 11, wherein said computer program segment is operable to retrieve a time indication as said predetermined access data and to restrict user selection to other than the locked path in the absence of said time indication being within a specified period.

15. The computer program segment of claim 11, wherein said computer program segment is operable to identify said predetermined access data from a data transmission.

16. The computer program segment of claim 11, wherein said computer program segment is operable to identify at least two image frame sequences as locked and requiring of at least two respective different arrangements of predetermined access data for unlocking, and is operable to call for the appropriate one of the at least two different respective access data arrangements.

17. The computer program segment of claim 11, wherein the computer program segment is operable to generate a user message in the event of non-receipt of said predetermined access data.

18. The computer program segment of claim 11, wherein the computer program segment is operable to identify at least two locking levels for respective paths, with different predetermined access data for each locking level.

19. The computer program segment of claim 11, wherein the computer program segment is operable to identify an encrypted locked path image sequence and to utilize said predetermined access data as one or more decryption key codes for decrypting the encrypted locked path image sequence.

20. The computer program segment of claim 11, wherein the computer program segment is operable to generate a visual indication of each approaching branch point except where a branch has only one unlocked path therefrom and said predetermined access data is absent.

21. Interactive entertainment apparatus operable to output sequences of image frames comprising a user-influenced path through a branch structured narrative, the apparatus comprising:

a source of image frames for all branch structure paths of the narrative;

branch storage means for data defining the narrative branch structure;

user operable input means;

branch selection means coupled to the branch store and operable to determine when the narrative reaches one of a plurality of branch points and to call one of two or more image frame sequences from the image frame source in dependence on the user input wherein at least one of said plurality of branch points prompts the user for input that determines path selection; and an output for the selected image frame sequences;

wherein the branch storage means contains further data identifying one or more image frame sequences as locked, and the branch selection means is operable to determine when a branch point having one or more locked paths therefrom is approaching, to call for predetermined access data, and to restrict selection to other than the locked path or paths in the absence of said predetermined access data.

22. Apparatus as claimed in claim 21, further comprising user storage means containing at least one user specific code, said code satisfying the call for predetermined access data and said branch selection means being configured to access the user storage means when calling.

23. Apparatus as claimed in claim 22, wherein said user storage means is non-volatile and removable from the apparatus.

24. Apparatus as claimed in claim 23, wherein said user storage means comprises a data card holding said at least one user specific code, and said apparatus further comprises means for reading said code from the card.

25. Apparatus as claimed in claim 22, wherein the or each user specific code is stored in the user memory following input thereof via the user operable input means.

26. Apparatus as claimed in claim 21, further comprising a current time of day source accessible by said branch selection means, wherein the call for predetermined access data is satisfied when the current time lies within a specified period.

27. Apparatus as claimed in claim 21, wherein said source of image frames includes a remote server connected to the apparatus through a data transmission network, wherein the predetermined access data is transmitted from the remote server to the apparatus, and the apparatus is operable to identify and store said predetermined access data.

28. Apparatus as claimed in claim 21, wherein the branch storage means identifies at least two image frame sequences as locked and requiring of respective different arrangements of predetermined access data by the branch selection means for unlocking, and said branch selection means is operable to call for the appropriate one of the at least two different respective access data arrangements.

29. Apparatus as claimed in claim 21, further comprising image generating means operable to generate display messages to the user on initialization of the apparatus and in the event of non-receipt of the predetermined access data.

30. A method for control of an interactive entertainment apparatus, where the apparatus presents to a user a branch structured narrative having a plurality of branch points, and at least one of said plurality of branch points prompts a user for user input such that said user input determines which path is followed in at least one narrative branch point, and where one or more narrative paths is identified as locked and requires predetermined access data to be presented to allow access thereto, otherwise an unlocked path will be followed.

31. A method as claimed in claim 30, wherein at least two locking levels are supported for respective paths, with different predetermined access data being required for each locking level.

32. A method as claimed in claim 30, wherein locked path image sequences are encrypted and the predetermined access data comprises one or more decryption key codes.

33. A method as claimed in claim 30, wherein the user is provided with a visual indication of each approaching branch point except where a branch has only one unlocked path therefrom and the predetermined access data has not been received.

34. A method as claimed in claim 30, wherein the predetermined access data requirement is satisfied by an indication that the local time of day is within a specified period.

35. A method as claimed in claim 30, wherein the predetermined access data requirement is satisfied by an indication that the local date is within a specified period.

* * * * *